(12) United States Patent
Nagai

(10) Patent No.: US 7,525,479 B2
(45) Date of Patent: Apr. 28, 2009

(54) RADAR APPARATUS

(75) Inventor: Tomohiro Nagai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/171,573

(22) Filed: Jul. 11, 2008

(65) Prior Publication Data

US 2008/0291088 A1    Nov. 27, 2008

Related U.S. Application Data

(63) Continuation of application No. PCT/JP2006/325530, filed on Dec. 21, 2006.

(30) Foreign Application Priority Data

Jan. 23, 2006 (JP) .............................. 2006-013654

(51) Int. Cl.
| | |
|---|---|
| G01S 13/42 | (2006.01) |
| G01S 7/35 | (2006.01) |
| G01S 13/32 | (2006.01) |
| G01S 13/89 | (2006.01) |
| G01S 13/66 | (2006.01) |
| G01S 13/93 | (2006.01) |

(52) U.S. Cl. ......................... 342/158; 342/27; 342/28; 342/70; 342/118; 342/128; 342/146; 342/147; 342/175; 342/176; 342/179; 342/180; 342/195; 701/300; 701/301

(58) Field of Classification Search ............... 342/22, 342/27, 28, 52–59, 70–81, 118, 128–133, 342/146–159, 175, 195, 33–35, 165, 173, 342/174, 176, 179, 180; 701/300, 301; 180/167–169; 324/600, 629, 637–646

See application file for complete search history.

(56) References Cited

U.S. PATENT DOCUMENTS 3,685,051 A * 8/1972 Wells .......................... 342/179

(Continued)

FOREIGN PATENT DOCUMENTS

JP    63-179271 A * 7/1988

(Continued)

OTHER PUBLICATIONS

PCT/JP2006/325530 International Search Report dated Jan. 23, 2007.

(Continued)

*Primary Examiner*—Bernarr E Gregory
(74) *Attorney, Agent, or Firm*—Dickstein Shapiro LLP

(57) ABSTRACT

An array antenna includes a first end portion that has a first plurality of antennas arranged with a spacing d therebetween and a second end portion that has a second plurality of antennas arranged with the spacing d therebetween. In the array antenna, a spacing between respective antennas in both the first and second end portions and are closest to a central portion is set to 2d, which is a value obtained from multiplying 2, which is the number of the antennas constituting each of both end portions, by the spacing d for both end portions. The antennas in the antenna array are continuously selected as a transmitting antenna by switching, and continuously emit transmission signals. The antennas in the antenna array are also successively selected as a receiving antenna by switching. In this way, by switching between transmission and reception of the antennas of the antenna array, nine reception channels CH1 through CH9 that are arranged with a uniform phase difference therebetween are obtained.

16 Claims, 10 Drawing Sheets

U.S. PATENT DOCUMENTS

| | | | | |
|---|---|---|---|---|
| 3,717,843 | A * | 2/1973 | Farrah et al. | 342/179 |
| 3,757,332 | A * | 9/1973 | Tricoles | 342/179 |
| 3,774,203 | A * | 11/1973 | Dooley | 342/179 |
| 4,783,134 | A * | 11/1988 | Hara et al. | 342/35 |
| 4,924,235 | A * | 5/1990 | Fujisaka et al. | 342/158 |
| 4,947,176 | A * | 8/1990 | Inatsune et al. | 342/165 |
| 5,327,139 | A * | 7/1994 | Johnson | 342/22 |
| 5,455,590 | A * | 10/1995 | Collins et al. | 342/179 |
| 5,557,283 | A * | 9/1996 | Sheen et al. | 342/179 |
| 5,734,347 | A * | 3/1998 | McEligot | 342/159 |
| 5,859,609 | A * | 1/1999 | Sheen et al. | 342/179 |
| 6,191,724 | B1 * | 2/2001 | McEwan | 342/118 |
| 6,414,627 | B1 * | 7/2002 | McEwan | 342/27 |
| 6,825,674 | B2 * | 11/2004 | Smith | 324/637 |
| 7,034,746 | B1 * | 4/2006 | McMakin et al. | 342/179 |
| 7,151,482 | B2 | 12/2006 | Natsume et al. | |
| 7,295,146 | B2 * | 11/2007 | McMakin et al. | 342/22 |
| 2004/0004568 | A1 * | 1/2004 | Smith | 342/165 |

FOREIGN PATENT DOCUMENTS

| | | | |
|---|---|---|---|
| JP | 63-179272 A * | 7/1988 | |
| JP | 63-179273 A * | 7/1988 | |
| JP | 63-187180 A * | 8/1988 | |
| JP | 63-187181 A * | 8/1988 | |
| JP | 63-256879 A * | 10/1988 | |
| JP | 1-316679 A * | 12/1989 | |
| JP | 5-52944 A * | 3/1993 | |
| JP | 6-207980 A * | 7/1994 | |
| JP | 3368874 | 1/2003 | |
| JP | 2004-245602 | 9/2004 | |
| JP | 2005-003393 | 1/2005 | |
| JP | 3622565 | 2/2005 | |
| JP | 2005-257384 | 9/2005 | |
| JP | 2006-003303 | 1/2006 | |
| WO | WO93/05408 A1 * | 3/1993 | |

OTHER PUBLICATIONS

PCT/JP2006/325530 Written Opinion dated Jan. 23, 2007.
Copy of PCT/ISA/210.

* cited by examiner

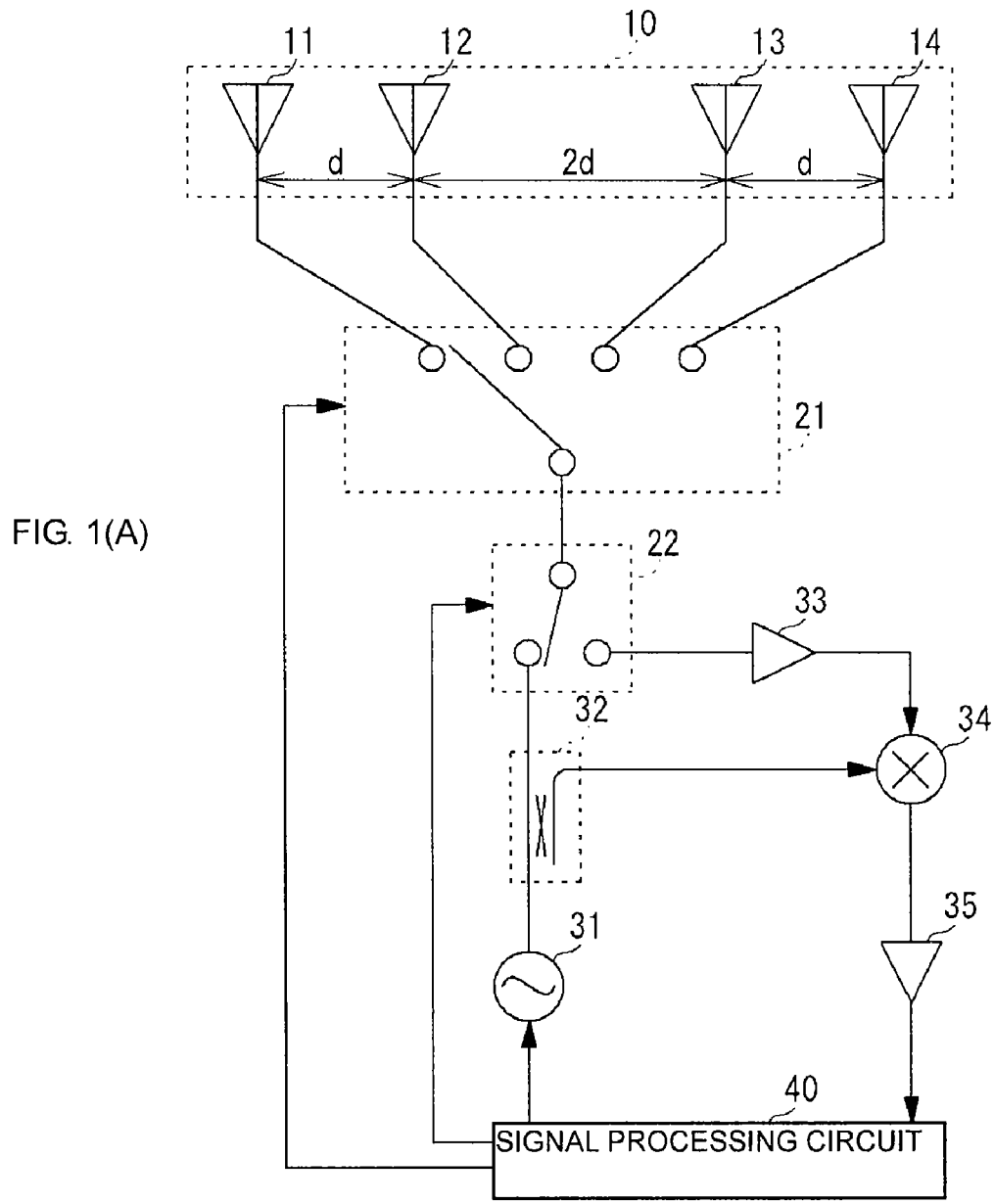

FIG. 2(A)
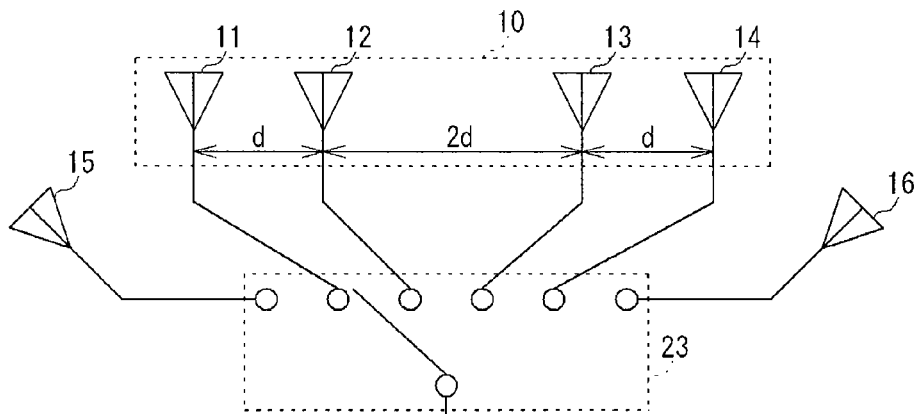
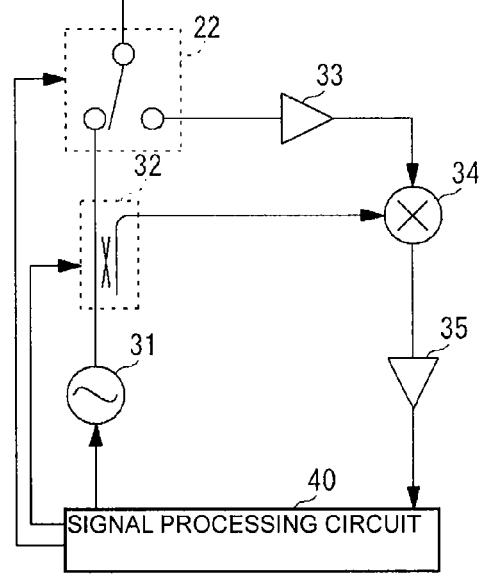
FIG. 2(B)
| TRANSMITTING ANTENNA | RECEPTION CHANNEL | | | | | | | | | | |
|---|---|---|---|---|---|---|---|---|---|---|---|
| | CH1 | CH2 | CH3 | CH4 | CH5 | CH6 | CH7 | CH8 | CH9 | CH31 | CH32 |
| ANTENNA 11 | ▽ | ▽ | | ▽ | ▽ | | | | | | |
| ANTENNA 12 | | ▽ | ▽ | | ▽ | ▽ | | | | | |
| ANTENNA 13 | | | | ▽ | ▽ | | ▽ | ▽ | | | |
| ANTENNA 14 | | | | | ▽ | ▽ | | ▽ | ▽ | | |
| ANTENNA 15 | | | | | | | | | | ○ | |
| ANTENNA 16 | | | | | | | | | | | ○ |
| COMBINED | ▽ | ▽ | ▽ | ▽ | ▽ | ▽ | ▽ | ▽ | ▽ | ○ | ○ |

FIG. 3

| TRANSMITTING ANTENNA | RECEPTION CHANNEL | | | | | | | | | | | | |
|---|---|---|---|---|---|---|---|---|---|---|---|---|---|
| | CH1 | CH2 | CH3 | CH4 | CH5 | CH6 | CH7 | CH8 | CH9 | CH33 | CH34 | CH35 | CH36 |
| ANTENNA 11 | ▽ | ▽ | | ▽ | ▽ | | | | | | | | |
| ANTENNA 12 | | ▽ | ▽ | | ▽ | ▽ | | | | | | | |
| ANTENNA 13 | | | | ▽ | ▽ | | ▽ | ▽ | | | | | |
| ANTENNA 14 | | | | | ▽ | ▽ | | ▽ | ▽ | | | | |
| ANTENNA 15 | | | | | | | | | | ▽ | ▽ | | |
| ANTENNA 16 | | | | | | | | | | | | ▽ | ▽ |
| COMBINED | ▽ | ▽ | ▽ | ▽ | ▽ | ▽ | ▽ | ▽ | ▽ | ▽ | ▽ | ▽ | ▽ |

FIG. 4
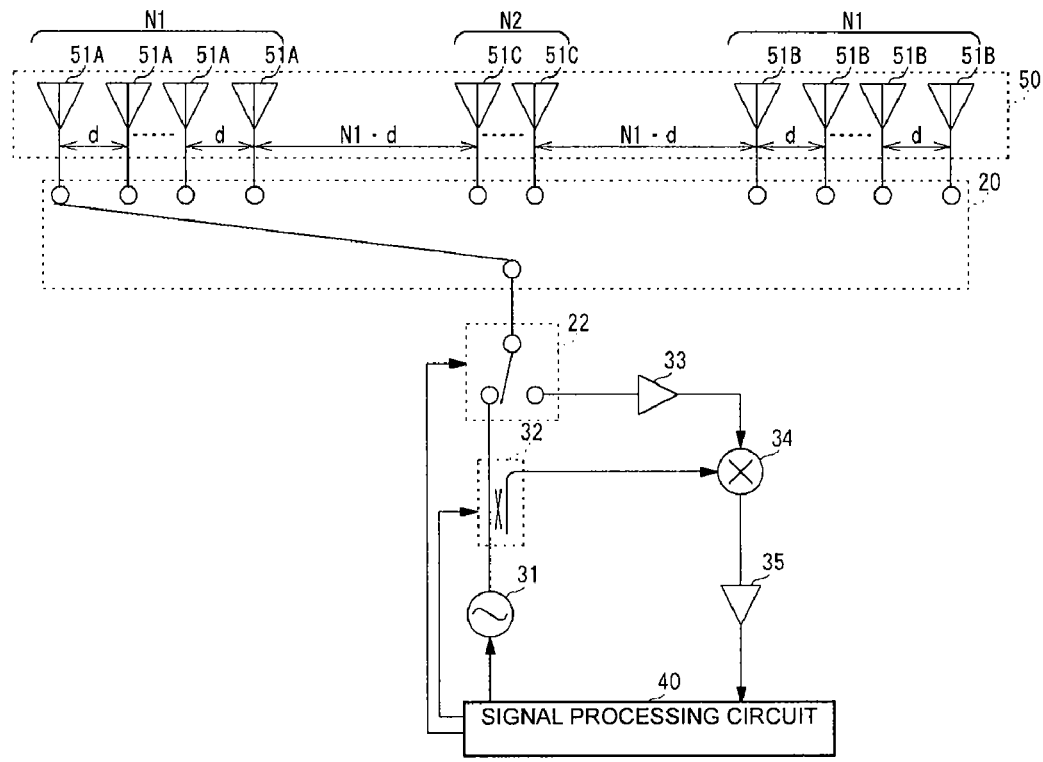
FIG. 5(A)
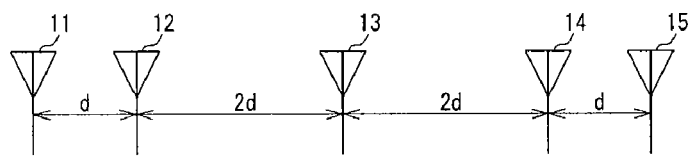
FIG. 5(B)
| TRANSMITTING ANTENNA | RECEPTION CHANNEL | | | | | | | | | | | | |
|---|---|---|---|---|---|---|---|---|---|---|---|---|---|
| | CH1 | CH2 | CH3 | CH4 | CH5 | CH6 | CH7 | CH8 | CH9 | CH10 | CH11 | CH12 | CH13 |
| ANTENNA 11 | ▽ | ▽ | | ▽ | | ▽ | ▽ | | | | | | |
| ANTENNA 12 | | ▽ | ▽ | | ▽ | | ▽ | ▽ | | | | | |
| ANTENNA 13 | | | | ▽ | ▽ | | | ▽ | ▽ | ▽ | | | |
| ANTENNA 14 | | | | | | ▽ | ▽ | | ▽ | | ▽ | ▽ | |
| ANTENNA 15 | | | | | | ▽ | ▽ | | ▽ | | | ▽ | ▽ |
| COMBINED | ▽ | ▽ | ▽ | ▽ | ▽ | ▽ | ▽ | ▽ | ▽ | ▽ | ▽ | ▽ | ▽ |

FIG. 6(A)
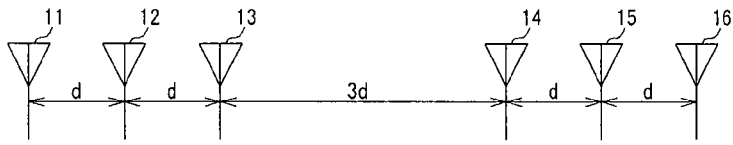
FIG. 6(B)
FIG. 7(A)
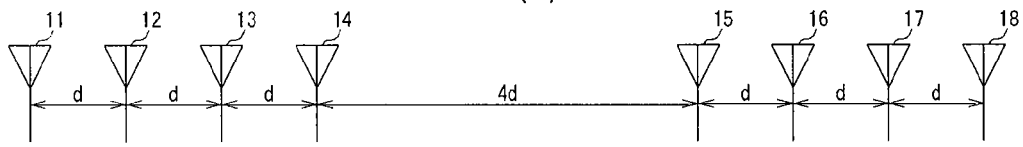
FIG. 7(B)

| TRANSMITTING ANTENNA | RECEPTION CHANNEL | | | | | | | | |
|---|---|---|---|---|---|---|---|---|---|
| | CH1 | CH2 | CH3 | CH4 | CH5 | CH6 | CH7 | CH8 | CH9 |
| ANTENNA 110 | ▽ | ▽ | ▽ | ▽ | ▽ | ▽ | ▽ | ▽ | ▽ |

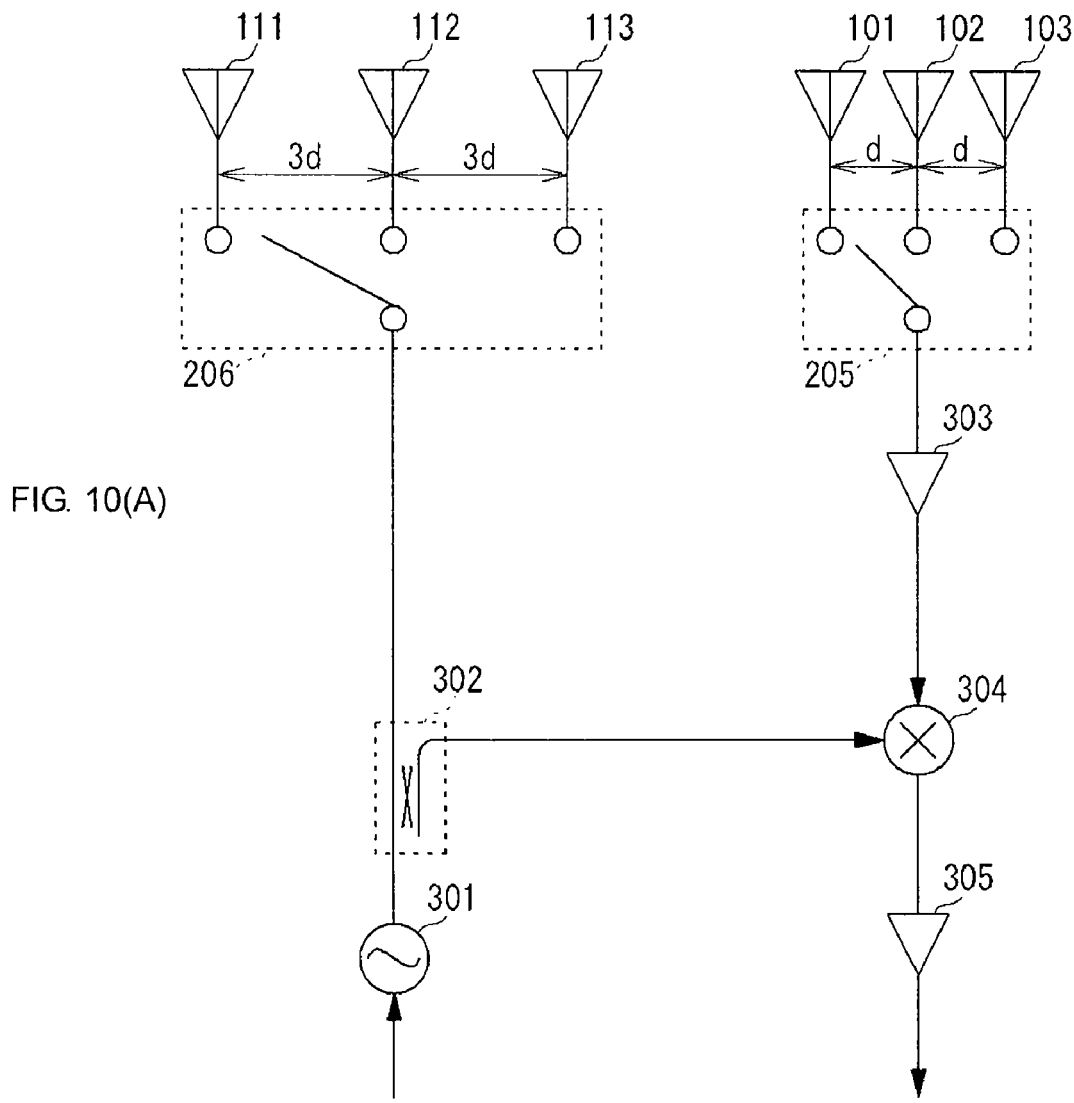

FIG. 12

| TRANSMITTING ANTENNA | RECEPTION CHANNEL | | | | | | | | | | |
|---|---|---|---|---|---|---|---|---|---|---|---|
| | CH1 | CH2 | CH3 | CH4 | CH5 | CH6 | CH7 | CH8 | CH9 | CH10 | CH11 |
| ANTENNA 401 | ▽ | ▽ | | ▽ | | ▽ | | | | | |
| ANTENNA 402 | | ▽ | ▽ | | ▽ | | ▽ | | | | |
| ANTENNA 403 | | | | ▽ | ▽ | | ▽ | | ▽ | | |
| ANTENNA 404 | | | | | | ▽ | ▽ | | ▽ | | ▽ |
| COMBINED | ▽ | ▽ | ▽ | ▽ | ▽ | ▽ | ▽ | | ▽ | | ▽ |

RADAR APPARATUS

CROSS REFERENCE TO RELATED APPLICATIONS

The present application is a continuation of International Application No. PCT/JP2006/325530, filed Dec. 21, 2006, which claims priority to Japanese Patent Application No. JP2006-013654, filed Jan. 23, 2006, the entire contents of each of these applications being incorporated herein by reference in their entirety.

FIELD OF THE INVENTION

The present invention relates to an FM-CW radar apparatus that is used for, for example, automotive anti-collision. More specifically, the present invention relates to a holographic radar apparatus that uses an array antenna.

BACKGROUND OF THE INVENTION

Various types of car-mounted radar apparatuses utilizing, for example, an FM-CW method have been devised. For example, a radar apparatus according to Patent Document 1 includes one transmitting antenna and a plurality of receiving antennas evenly spaced apart. The radar apparatus receives a reflected wave by successively switching the receiving antennas during a modulation cycle of a transmission wave. An azimuth of an object is detected by calculating phase differences between reflected waves received each by one of the receiving antennas.

FIG. 9(A) is a block diagram of a radar apparatus in a related-art example 1 corresponding to Patent Document 1 in a case in which nine reception channels are realized. FIG. 9(B) is a diagram showing a reception-channel state with this structure. The radar apparatus in the related-art example 1 includes receiving antennas 101 through 109, a transmitting antenna 110, switch circuits 201 through 204, a VCO 301, a branch circuit 302, a LNA 303, a mixer 304, and an IF amplifier 305. In this case, the receiving antennas 101 through 109 are evenly spaced apart by a spacing d. The receiving antennas 101 through 109, which are evenly spaced apart by the spacing d, receive a reflected wave corresponding to a transmission wave transmitted from the transmitting antenna 110. As shown in FIG. 9(B), each of the reflected waves is assigned to a corresponding one of channels CH1 through CH9 that are arranged with a phase difference $(2\pi d \sin\theta)/\lambda$ therebetween.

In addition, a radar apparatus corresponding to Patent Document 2 includes a plurality of transmitting antennas evenly spaced apart by a first spacing and a plurality of receiving antennas evenly spaced apart by a second spacing. A transmission wave is transmitted by successively switching the transmitting antennas, and the transmission wave is received by successively switching the receiving antennas for each of the transmitting antennas.

FIG. 10(A) is a block diagram of a radar apparatus in a related-art example 2 corresponding to Patent Document 2 in a case in which nine reception channels are realized. FIG. 10(B) is a diagram showing a reception-channel state with this structure. The radar apparatus in the related-art example 2 includes the receiving antennas 101 through 103, transmitting antennas 111 through 113, switch circuits 205 and 206, the VCO 301, the branch circuit 302, the LNA 303, the mixer 304, and the IF amplifier 305. In this case, the receiving antennas 101 through 103 are evenly spaced apart by the spacing d and the transmitting antennas 111 through 113 are evenly spaced apart by a spacing 3d. The receiving antennas 101 through 103 successively receive a reflected wave obtained from reflection of a transmission wave transmitted from the transmitting antennas 111, 112, and 113 that are successively switched. As shown in FIG. 10(B), each of reflected waves is assigned to a corresponding one of channels CH1 through CH9 that are arranged with a phase difference $(2\pi d \sin\theta)/\lambda$ therebetween.

In addition, a radar apparatus according to Patent Document 3 includes a plurality of transmitting-and-receiving two-way antennas, and each of spacings between the transmitting-and-receiving two-way antennas is set to a predetermined value. A transmitting antenna is selected in synchronization with a modulation cycle of the transmission wave, and a receiving antenna is selected in a cycle shorter than the modulation cycle for the selected transmitting antenna.

FIG. 11 is a block diagram of a radar apparatus in a related-art example 3 corresponding to Patent Document 3 in a case in which eleven reception channels are realized. The radar apparatus in the related-art example 3 includes transmitting-and-receiving two-way antennas 401 through 404, switch circuits 501 and 502, the VCO 301, a coupler 302, the LNA 303, the mixer 304, and the IF amplifier 305. In this case, the transmitting-and-receiving two-way antennas 401 through 404 are arranged with spacings d, 2d, and 2d in this order therebetween. One of the transmitting-and-receiving two-way antennas is selected as a transmitting antenna and transmits a transmission wave, and the transmitting-and-receiving two-way antennas are successively selected as a receiving antenna and successively receive a reflected wave. In this way, as shown in FIG. 12, each of reflected waves is assigned to a corresponding one of reception channels. FIG. 4 in Patent Document 3 shows a diagram in which, as the number of channels, eleven channels have been allocated. This is because, in Patent Document 3, channel allocation of these channels is set using temporal differences. That is, since the channels are allocated using the temporal differences, the eleven channels having temporal differences therebetween are formed according to a signal, as a standard, received by the transmitting antenna. If this is set in terms of positional differences in space, the antenna 401 arranged at an end becomes a standard for a transmission and reception signal, and the number of channels and spacing between the channels as shown in FIG. 12 of the present invention are obtained.

Patent Document 1: Japanese Patent No. 3622565

Patent Document 2: Japanese Patent No. 3368874

Patent Document 3: Japanese Unexamined Patent Application Publication No. 2005-3393

However, in the related-art example 1, the nine receiving antennas are necessary in a case in which nine reception channels are formed. In addition to these antennas, the transmitting antenna 110 is additionally necessary. Moreover, a plurality of stages of the switch circuits 201 through 204 used to select one receiving antenna from the receiving antennas 101 through 109 are necessary. Thus, such a radar apparatus is large, and loss of the reception signal increases.

In the related-art example 2, the number of antennas is decreased compared with the related-art example 1; however, spacings between the transmitting antennas 111 through 113 need to be set to be large, and such a radar apparatus is still large.

In the related-art example 3, with respect to a point that nine channels are realized, a small radar apparatus can be realized compared with the related-art examples 1 and 2. However, the channels are not set to be arranged with a uniform phase difference therebetween in the related-art example 3 since the transmitting-and-receiving two-way antennas are arranged with spacings whose ratio is 1:2:2. In the example shown in FIG. 12, channels CH8 and CH10 among the eleven channels are missing, and the phase difference between channels CH7 and CH9 is 4πd(sin θ)/λ and the phase difference between channels CH9 and CH11 is 4πd(sin θ)/λ. The phase difference between the other channels is 2πd(sin θ)/λ. Thus, nine channels that are not arranged with a uniform phase difference therebetween substantially need to be utilized. Therefore, the azimuth of an object is partially undetected, and azimuth-detection performance for object detection is low.

SUMMARY OF THE INVENTION

Thus, an object of the present invention is to realize a radar apparatus that has high azimuth-detection performance without the occurrence of the azimuth of an object being partially undetected even if the size of the radar apparatus is made to be small.

According to this invention, a radar apparatus includes an antenna array in which a plurality of antennas that can transmit as well as receive are arranged, and selection means for selecting a transmitting antenna and a receiving antenna from among the antennas that can transmit as well as receive. In the radar apparatus, a transmission wave whose frequency has been modulated is transmitted from the transmitting antenna selected by the selection means, a reflected wave obtained from reflection of the transmission wave is received by one of receiving antennas selected by the selection means by successively switching the receiving antennas, and an azimuth of an object is detected using a phase difference between reflected waves received by the receiving antennas. In the radar apparatus, in the antenna array, N1 antennas that can transmit as well as receive are arranged with a spacing d therebetween at each of both end portions, and a spacing between antennas that can transmit as well as receive and are closest to an array central portion in both end portions of the array is N1×d or an antenna that can transmit as well as receive is arranged with a spacing N1×d between both end portions of the array.

With this structure, in the antenna that can transmit as well as receive and constitutes the antenna array, an arrangement spacing between the antennas that can transmit as well as receive and constitute both end portions is narrower than a spacing between both end portions or an arrangement spacing between the antennas that can transmit as well as receive and are arranged at the central potion between both end portions. That is, antenna arrangement is denser in both end portions than in the central portion. In this case, with respect to each transmitting antenna, since a channel is allocated on the basis of an arrangement spacing between the receiving antennas, a phase difference between channels is wider in a portion corresponding to the central portion of the antenna array for each transmitting antenna. Here, since the transmitting antennas are continuously switched and signals are continuously emitted, even if the transmitting antennas are switched, the transmitting antenna that is regarded as a standard is the antenna that can transmit as well as receive and was the transmitting antenna selected first. A channel set by a receiving antenna corresponding to a transmitting antenna to which the first transmitting antenna has been switched is shifted according to a positional relationship between the first transmitting antenna and the antenna to which the first transmitting antenna has been switched. Thus, all channels are set to phases corresponding to the first-selected transmitting antenna.

According to this, the transmitting antennas are switched and shifted. This causes a channel-arrangement pattern to be shifted as well, and a portion whose phase difference between channels is relatively large and which corresponds to the central portion of the antenna array for a single transmitting antenna is interpolated by using a portion whose phase difference between channels is relatively small and which corresponds to both end portions of the antenna array for another transmitting antenna. In this case, as described above, a state in which receiving antennas are arranged with an even spacing is formed in a pseudo manner by setting a spacing between antennas arranged between both end portions or arranged in the central portion to be a value obtained from multiplying the number of antennas constituting both end portions by a spacing between the antennas at both end portions. Thus, as shown in FIG. 1, as a whole, phase differences between channels become equal.

In the radar apparatus according to this invention, the selection means may perform selection by switching transmitting antennas in a cycle shorter than a modulation cycle of the transmitting wave.

With this structure, by making a switching speed between the antennas that can transmit as well as receive to be faster, there is almost no time difference between reception signals (reflected waves) at each of the receiving antennas and detection processing is performed assuming that the detection object is not moving.

In the radar apparatus according to this invention, the total number of antennas that constitute the antenna array and can transmit as well as receive may be an integer N which is two or more, and the number of the antennas N1, the antennas being arranged at both end portions of the array and capable of transmitting as well as receiving, may be an integer rounded up from the equation (N+3)/4.

With this structure, the number of antennas that can transmit as well as receive and arranged at both end portions is set to be the integer rounded up from (N+3)/4. If the total number of the antennas is N, the number of channels that can be set is 2(N−2N1+3)·N1−3 according to an above-described arrangement condition for the antennas that can transmit as well as receive. Thus, when N1=(N+3)/4, the number of channels is the maximum. However, since the number of the antennas that can transmit as well as receive is, as a matter of course, an integer, an antenna array appropriate for the set total number of antennas that can transmit as well as receive is constituted by setting the N1 that is the closest integer satisfying N1 ≠(N+3)/4 as the number of antennas that can transmit as well as receive at both end portions.

In the radar apparatus according to this invention, the antennas that can transmit as well as receive included in the antenna array may be arranged in a straight line in a manner such that transmission-and-reception surfaces of the antennas that can transmit as well as receive are directed in the same direction.

With this structure, the antennas that can transmit as well as receive and constitute the antenna array transmit transmission waves to detection areas that are approximately the same, and receive reflected waves that are reflected from these detection areas, and the antennas that can transmit as well as receive are arranged in the direction of one dimension. This simplifies a phase relationship between the channels and simplifies phase-difference calculation processing.

In the radar apparatus according to this invention, an antenna for wide-angle detection is arranged at both ends of the array antenna in a manner such that a transmission-and-reception surface of the antenna for wide-angle detection is directed in a direction different from that of the antennas that can transmit as well as receive and are arranged in a straight line.

With this structure, a detection area that is located in a direction different from the detection area detected by the antennas that can transmit as well as receive and arranged in a straight line is detected by the antenna for wide-angle detection.

In the radar apparatus according to this invention, the selection means performs transmission-switching selection for the antenna for wide-angle detection in synchronization with the modulation cycle.

With this structure, since the transmission switching of the antenna for wide-angle detection synchronizes with the modulation cycle, azimuth-detection performance cannot be improved; however, object detection is assuredly executed, and detection processing in the area corresponding to the antenna for wide-angle detection is simplified.

In the radar apparatus according to this invention, the selection means performs, in a cycle shorter than the modulation cycle, transmission-switching selection for the antenna for wide-angle detection, the antenna for wide-angle detection is not selected as a receiving antenna, and an antenna near the antenna for wide-angle detection is selected as the receiving antenna, the antenna near the antenna for wide-angle detection being capable of transmitting as well as receiving and arranged at one of both end portions in the antenna array.

With this structure, the reflected wave according to the transmission wave transmitted from the antenna for wide-angle detection is received by switching antennas that can transmit as well as receive (receiving antennas) and arranged near the antenna for wide-angle detection in the antenna array. Because of this, even in the area corresponding to the antenna for wide-angle detection, a plurality of channels can be obtained with respect to one antenna for wide-angle detection.

In the radar apparatus according to this invention, detection means for performing object detection on the basis of the reflected wave may include a temperature sensor and perform object detection after the reflected wave is corrected on the basis of a temperature detected by the temperature sensor.

With this structure, by performing temperature correction, even if an array antenna that is formed with a material whose temperature characteristics are not great is used, an amplitude of a transmission wave, a transmission-wave phase, an amplitude of a reception wave, and a reception-wave phase can be accurately obtained.

According to this invention, even if the number of arranged antennas is small, many reception channels, compared with the number of antennas, can be formed with a uniform phase difference therebetween. Thus, a radar apparatus with very high azimuth-detection performance can be realized with a small and simple structure.

In addition, according to this invention, by switching transmitting antennas in a cycle shorter than a transmission cycle of a transmission wave and furthermore by switching receiving antennas for each of the transmitting antennas, a plurality of reception signals can be obtained in a state in which an object is almost still, and performance for detecting the azimuth of a detection object can be more greatly increased.

In addition, according to this invention, by setting the number of antennas N1 that can transmit as well as receive and constitute both of end portions of an antenna array to the closest integer satisfying N1=(N+3)/4, an appropriate antenna array can be constituted in response to the set total number of antennas N that can transmit as well as receive. This allows a radar apparatus having the highest azimuth detection performance to be constituted.

In addition, according to this invention, by causing the antennas that can transmit as well as receive to be arranged in a straight line and to correspond to the same detection area, phase-difference calculation processing can be simplified, azimuth detection can be speeded up, and furthermore object-detection processing can be speeded up.

In addition, according to this invention, object detection can be performed in a wide detection area including an area existing at both ends of a detection area of the antenna array.

In addition, according to this invention, detection processing in the area existing at both ends of the detection area is simplified, a decrease in object-detection speed in the entirety of the wide-angle area can be suppressed without lowering the azimuth-detection accuracy in the detection area of the array antenna, which is a main detection area.

In addition, according to this invention, object detection can be performed with a predetermined azimuth-detection accuracy even in the area existing at both ends of and outside of the detection area of the antenna array.

In addition, according to this invention, even if the antenna array is formed with a material which is relatively cheap and whose temperature characteristics are not great, object detection can be accurately performed without lowering the azimuth-detection accuracy.

BRIEF DESCRIPTION OF DRAWINGS

FIG. 1(A) is a block diagram of a structure of a main part of a radar apparatus according to a first embodiment, and FIG. 1(B) is a schematic diagram showing a relationship between transmitting antennas and reception channels.

FIG. 2(A) is a block diagram of a structure of a main part of a radar apparatus according to a second embodiment, and FIG. 2(B) is a schematic diagram showing a relationship between transmitting antennas and reception channels.

FIG. 3 is a schematic diagram showing a relationship between transmitting antennas and reception channels according to a third embodiment.

FIG. 4 is a block diagram showing a concept of an antenna-arrangement pattern in a radar apparatus of the present invention.

FIG. 5(A) is a schematic diagram showing an arrangement in a case in which the number of antennas is "5", and FIG. 5(B) is a schematic diagram showing a relationship between transmitting antennas and reception channels in this case.

FIG. 6(A) is a schematic diagram showing an arrangement in a case in which the number of antennas is "6", and FIG. 6(B) is a schematic diagram showing a relationship between transmitting antennas and reception channels in this case.

FIG. 7(A) is a schematic diagram showing an arrangement in a case in which the number of antennas is "8", and FIG. 7(B) is a schematic diagram showing a relationship between transmitting antennas and reception channels in this case.

FIG. 10(A) is a block diagram of a radar apparatus of a related-art example 2 corresponding to Patent Document 2 in a case in which nine reception channels are realized, and FIG. 10(B) is a diagram showing a reception-channel state in this structure.

FIG. 12 is a diagram showing a reception-channel state in the radar apparatus shown in FIG. 11.

Figure 8:
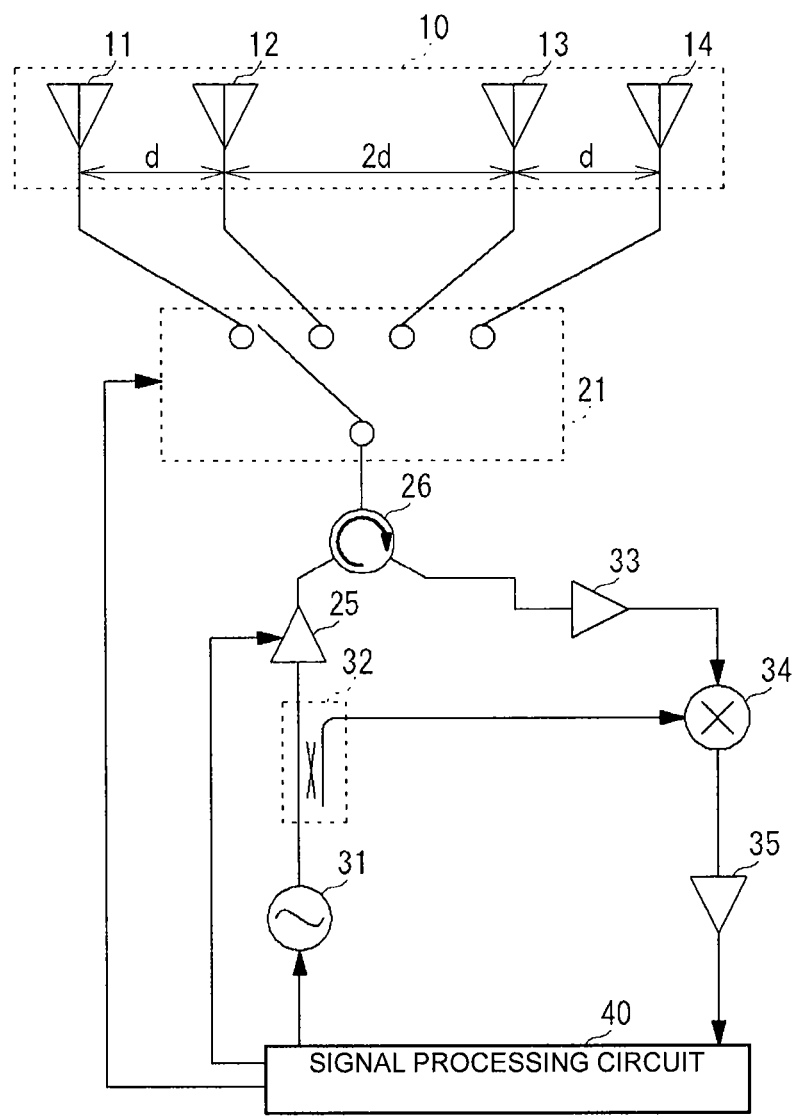
FIG. 8 is a block diagram showing a structure of a radar apparatus using another transmission-and-reception method of the present invention.
Figures 9A, 9B:
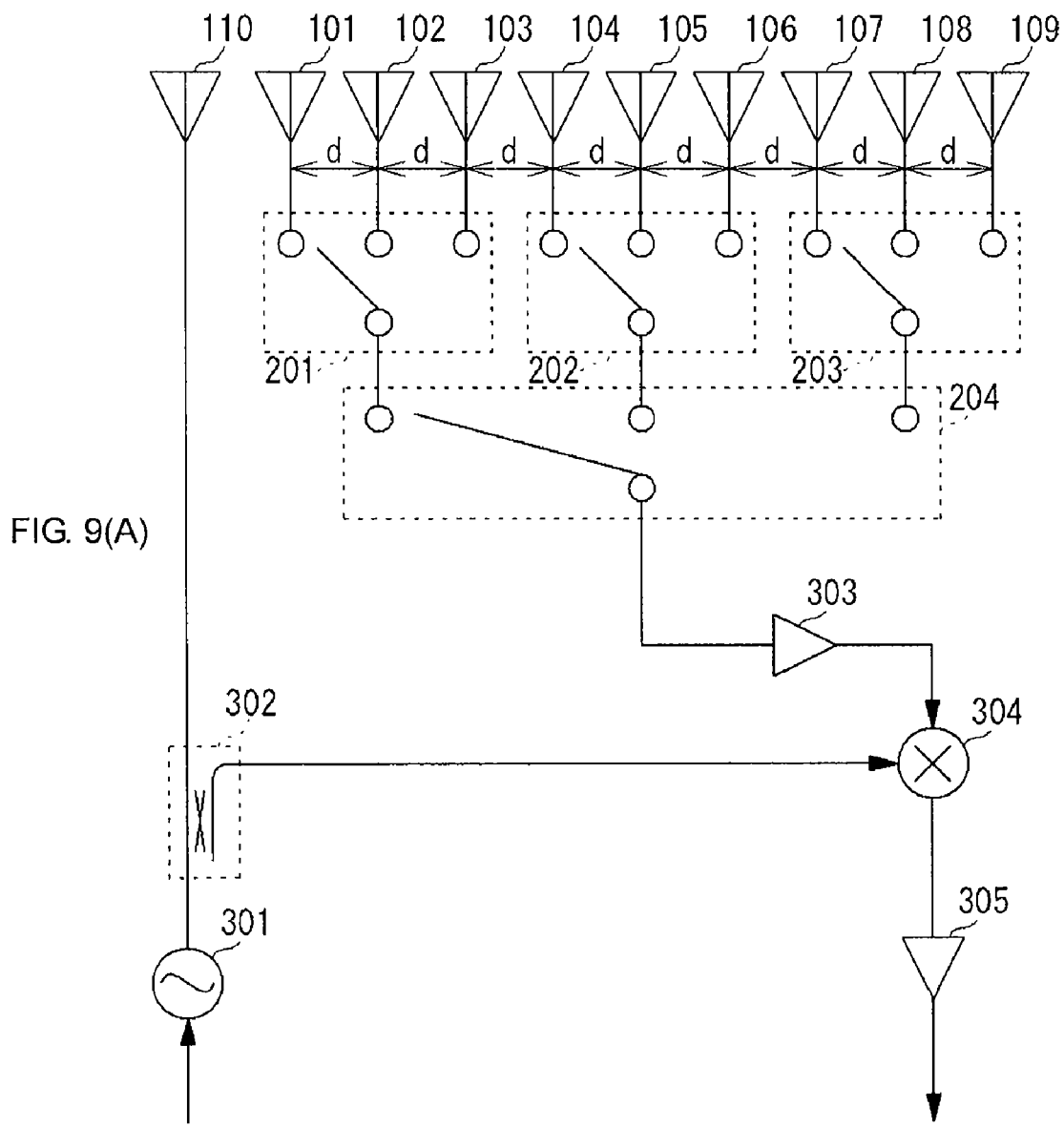
FIG. 9(A) is a block diagram of a radar apparatus of a related-art example 1 corresponding to Patent Document 1 in a case in which nine reception channels are realized.
FIG. 9(B) is a diagram showing a reception-channel state in this structure.
Figure 11:
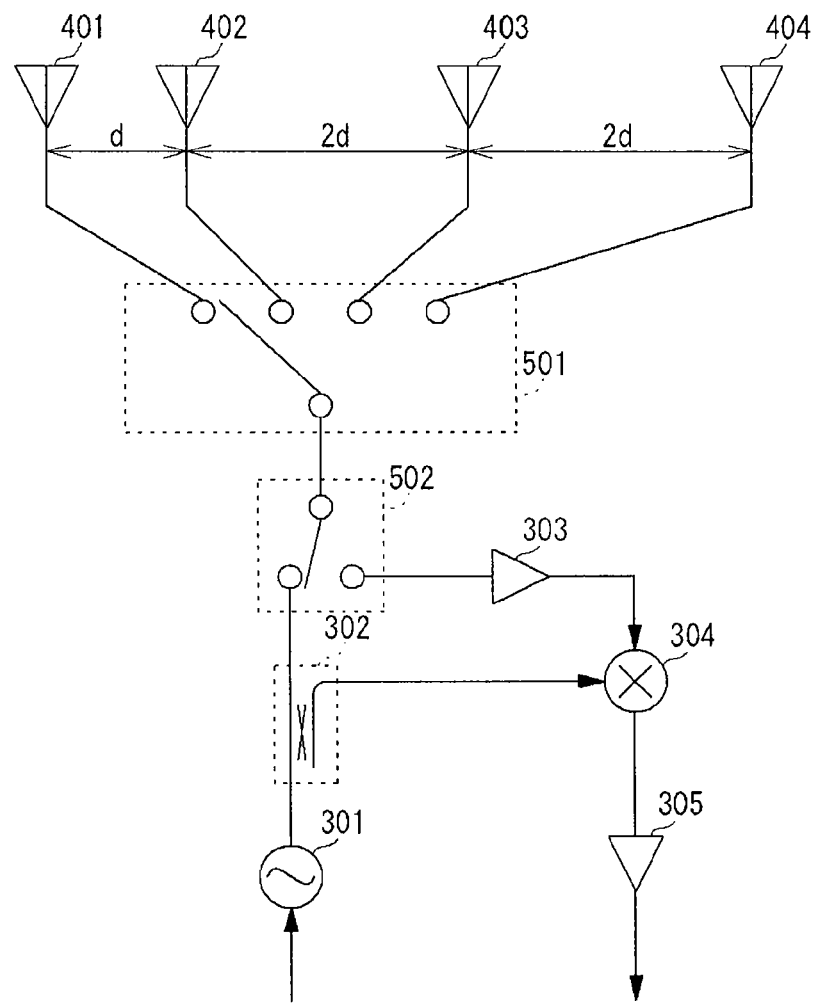
FIG. 11 is a block diagram of the radar apparatus of the related-art example 1 corresponding to Patent Document 1 in a case in which eleven reception channels are realized.

REFERENCE NUMERALS 10, 50 array antenna
11 through 16, 51A, 51B, 51C antenna
20 through 23 switch circuit
25 switch amplifier
26 circulator
31 VCO
32 branch circuit
33 LNA
34 mixer
35 IF amplifier
40 signal processing circuit

DETAILED DESCRIPTION OF THE INVENTION

A radar apparatus according to a first embodiment of the present invention will be described with reference to the drawings.

FIG. 1(A) is a block diagram showing a structure of a main part of the radar apparatus according to the first embodiment, and FIG. 1(B) is a schematic diagram showing a relationship between transmitting antennas and reception channels.

The radar apparatus according to the first embodiment includes an array antenna 10, switch circuits 21 and 22, a voltage-controlled oscillator (VCO) 31, a branch circuit 32, an LNA 33, a mixer 34, an IF amplifier 35, and a signal processing circuit 40.

The array antenna 10 includes an antenna array in which antennas 11 through 14 that can transmit as well as receive are arranged in a straight line. All the antennas 11 through 14 are arranged in a way such that front sides of the antennas 11 through 14 are directed in the same direction. In this case, a spacing between the antenna 11 arranged at one end of the antenna array and the antenna 12 arranged at a position next to the antenna 11 is d. A spacing between the antenna 14 arranged at the other end of the antenna array and the antenna 13 arranged at a position next to the antenna 14 is also d. One end portion including the antennas 11 and 12 and the other end portion including the antennas 13 and 14 constitute both end portions.

Here, the number of antennas arranged at both end portions is "N1", and can be derived from the following method. If the total number of antennas arranged in the array antenna 10 is "N" and the number of antennas arranged at each of both end portions is "N1", use of this array antenna can realize a reception-channel array antenna that is equivalent to a reception-channel array whose number of reception channels is $2(N-N1+3) \cdot N1-3$. This is a quadratic expression in terms of N1, and a maximum number of settable channels corresponds to a maximum value of this quadratic expression. Thus, in order to obtain the number of channels corresponding to the settable maximum value, an integer N1 that is closest to the N1 in the following expression should be used, $$N1=(N+3)/4 \qquad (1).$$

For example, as in the first embodiment, if the total number "N" is "4", $(N+3)/4=1.75$ and the number of antennas "N1" is "2". In this case, the number of reception channels is "9". Since the total number of antennas is "4" and the number of antennas for each of both end portions is "2", no antennas need be arranged between these both end portions in the first embodiment.

A spacing between the antenna 12 and the antenna 13, that is, the spacing between both end portions, is set to a value obtained by multiplying the number of antennas (N1) "2", the antennas constituting each of both end portions, for each of both end portions by the spacing between the antennas "d", $$N1 \cdot d \qquad (2).$$

In the case of the first embodiment, the spacing between the antenna 12 and the antenna 13 is 2d. Here, in the first embodiment, an example in which no antenna is arranged between both end portions is shown; however, if antennas are arranged in a central portion between the end portions, a spacing between antennas in the central portion should be "N1·d" expressed by expression (2).

The antennas 11 through 14 are selected using the switch circuit 21, and an antenna selected when transmitting (hereinafter an antenna in this state is referred to as a "transmitting antenna") emits (transmits) a transmission signal to an external detection area. In addition, an antenna selected when receiving (hereinafter an antenna in this state is referred to as a "receiving antenna") receives a reflected wave obtained from reflection of the transmission signal, that is, a wave reflected from an object in the detection area, and outputs a reception signal based on this reflected wave to the switch circuit 21.

The array antenna 10 having such a structure is realized by, for example, using a microstrip array antenna, a waveguide slot antenna, or the like. In such a microstrip array antenna, patch antennas formed in a straight line with the above-mentioned spacing therebetween are connected in parallel with one another using an electrode pattern on a surface of a dielectric substrate. In such a waveguide slot antenna, slot-opening portions are formed with the above-mentioned spacing therebetween on a surface of a rectangular waveguide.

The VCO 31 generates, for example, a transmission signal in the 76 GHz band in response to a modulation voltage supplied from the signal processing circuit 40. In this case, a modulation voltage whose voltage value changes in a predetermined cycle, for example, a modulation voltage that changes in a triangular-wave manner in a predetermined cycle is supplied to the VCO 31. The VCO 31 generates a transmission signal whose frequency is modulated within a predetermined frequency range in response to this modulation voltage in the predetermined cycle, for example, a transmission signal whose frequency is modulated in a triangular-wave manner.

The branch circuit 32 supplies, to the switch circuit 22, the transmission signal output from the VCO 31, and part of the transmission signal to the mixer 34 as a local signal.

The switch circuit 22 connects the VCO 31 to the switch circuit 21 in response to a transmission selection signal supplied from the signal processing circuit 40, and supplies, to the switch circuit 21, the transmission signal output from the VCO 31. The switch circuit 22 connects the switch circuit 21 to the LNA 33 in response to a reception selection signal supplied from the signal processing circuit 40, and supplies, to the LNA 33, a reception signal supplied from the switch circuit 21.

The switch circuit 21 connects a selected transmitting antenna or receiving antenna to the switch circuit 22 in response to an antenna selection signal supplied from the signal processing circuit 40. When transmitting, a transmission signal input via the switch circuit 22 is output to the selected transmitting antenna, and when receiving, a reception signal output from the selected receiving antenna is supplied to the switch circuit 22. Here, the switch circuits 21 and 22 may be mechanical switches, electronic components utilizable as switches, or software switches.

The LNA 33 amplifies the reception signal that has been input and outputs the amplified reception signal to the mixer 34. The mixer 34 mixes a reception signal supplied from the LNA 33 and the local signal supplied from the branch circuit 32, and generates an IF beat signal. The IF amplifier 35 amplifies the IF beat signal and outputs the amplified IF signal to the signal processing circuit 40, As described above, the signal processing circuit 40 supplies the modulation voltage to the VCO 31, supplies the antenna selection signal to the switch circuit 21, and supplies the transmission selection signal or reception selection signal to the switch circuit 22. In this case, the signal processing circuit 40 sets an interval of switching transmitting antennas according to the transmission selection signal to an interval shorter than the modulation cycle according to the modulation voltage. For example, in a case of the transmission signal whose frequency is modulated in a triangular-wave manner, the signal processing circuit 40 sets reception to be performed through all the channels within a cycle of frequency modulation, that is, within one triangular wave.

Moreover, the signal processing circuit 40 calculates, for example, the speed of and distance to a detected object by using the IF beat signal that has been input and by performing calculation according to a known FM-CW method. Furthermore, the signal processing circuit 40 detects the azimuth of a detected object using the principle of holographic radar from reception signals for channels CH1 through CH9 formed by using the antennas 11 through 14 described below.

Next, a detection operation performed by the radar apparatus according to the first embodiment will be specifically described. Here, in the following description, a case in which transmitting antennas and receiving antennas are switched in the order of the antenna 11, the antenna 12, the antenna 13, and the antenna 14 will be described; however, the switching order of antennas is not limited to this, and the switching order may be appropriately set as necessary.

(1) When a detection operation is started, the signal processing circuit 40 supplies a modulation voltage to the VCO 31. In the later detection operation, the signal processing circuit 40 continuously supplies a modulation voltage to the VCO 31, and the VCO 31 continuously generates a transmission signal whose frequency is modulated.

In addition, the signal processing circuit 40 supplies a transmission selection signal to the switch circuit 22, and supplies an antenna selection signal used to select the antenna 11 to the switch circuit 21. The antenna 11 transmits a transmission signal generated by the VCO 31 to a detection area.

(2) The signal processing circuit 40 supplies a reception selection signal to the switch circuit 22, and supplies an antenna selection signal to the switch circuit 21. The antenna selection signal when receiving is a signal used to select a receiving antenna in the order of the antenna 11, the antenna 12, the antenna 13, and the antenna 14 at a predetermined interval. This causes the antennas 11 through 14 to successively function as a receiving antenna and receive a reflected wave based on the transmission signal supplied from the transmitting antenna 11. The receiving antennas 11 through 14 successively output a reception signal to the LNA 33 via the switch circuit 21 and the switch circuit 22.

Here, since the antennas 11 through 14 are arranged with the above-described spacing therebetween, each of reception signals received by the antennas 11 through 14, as shown in FIG. 1(B), is set as a reception signal for one of the reception channels CH1 through CH9 that are set so as to be arranged with a phase difference $2\pi d(\sin \theta)/\lambda$ therebetween. Here, $\lambda$ represents a wavelength of a reception signal and $\theta$ represents an incident angle of the reception signal, that is, an angle with respect to the direction of the normal to a front side of an antenna.

More particularly, if a reception signal received by the antenna 11 in response to a transmission signal transmitted by the antenna 11 is a reception signal of the reception channel CH1, which is a standard, a reception signal received by the antenna 12 is set as a reception signal of the reception channel CH2 that is shifted from the reception channel CH1 by a phase difference $2\pi d(\sin \theta)/\lambda$. Moreover, a reception signal received by the antenna 13 is set as a reception signal of the reception channel CH4 that is shifted from the reception channel CH2 by a phase difference $4\pi d(\sin \theta)/\lambda$. Moreover, a reception signal received by the antenna 14 is set as a reception signal of the reception channel CH5 that is shifted from the reception channel CH4 by a phase difference $2\pi d(\sin \theta)/\lambda$.

(3) The signal processing circuit 40 supplies a transmission selection signal to the switch circuit 22 and supplies, to the switch circuit 21, an antenna selection signal used to select the antenna 12. The transmitting antenna 12 transmits a transmission signal generated by the VCO 31 to the detection area.

(4) The signal processing circuit 40 supplies a reception selection signal to the switch circuit 22, and supplies an antenna selection signal to the switch circuit 21. The antenna selection signal when receiving is the same as the antenna selection signal indicated in (2). The antennas 11 through 14 successively function as a receiving antenna, and receive a reflected wave based on the transmission signal supplied from the transmitting antenna 12. The receiving antennas 11 through 14 successively output a reception signal to the LNA 33 via the switch circuit 21 and the switch circuit 22. In this case, since switching among the transmitting antennas is continuously performed and signals are continuously emitted, even if the transmitting antenna is switched from the antenna 11 to the antenna 12, the reception channel CH1 is still the standard. Thus, reception channels obtained by shifting the reception channels corresponding to the transmitting antenna 11 by the phase difference $2\pi d(\sin \theta)/\lambda$, which corresponds to a spacing d between the transmitting antenna 11 and the transmitting antenna 12, are set as reception channels allocated to the receiving antennas 11 through 14 corresponding to the transmitting antenna 12. More particularly, a reception signal received by the antenna 11 is set as a reception signal of the reception channel CH2 that is shifted from the reception signal of the reception channel CH1 by the phase difference $2\pi d(\sin \theta)/\lambda$. The reception signal received by the antenna 12 is set as a reception signal of the reception channel CH3 that is shifted from the reception channel CH2 by a phase difference $2\pi d(\sin \theta)/\lambda$. The reception signal received by the antenna 13 is set as a reception signal of the reception channel CH5 that is shifted from the reception channel CH3 by a phase difference $4\pi d(\sin \theta)/\lambda$. The reception signal received by the antenna 14 is set as the reception signal of the reception channel CH6 that is shifted from the reception channel CH5 by a phase difference $2\pi d(\sin \theta)/\lambda$.

(5) The signal processing circuit 40 supplies a transmission selection signal to the switch circuit 22 and supplies, to the switch circuit 21, an antenna selection signal used to select the antenna 13. The transmitting antenna 13 transmits a transmission signal generated by the VCO 31 to the detection area.

(6) The signal processing circuit 40 supplies a reception selection signal to the switch circuit 22 and supplies an antenna selection signal to the switch circuit 21. The antenna selection signal when receiving is the same as the antenna selection signals indicated in (2) and (4). The antennas 11 through 14 successively function as a receiving antenna, and receive a reflected wave based on the transmission signal supplied from the transmitting antenna 13. The receiving antennas 11 through 14 successively output a reception signal to the LNA 33 via the switch circuit 21 and the switch circuit 22. In this case, reception channels that are obtained by shifting the reception channels corresponding to the transmitting antenna 11 by the phase difference $6\pi d(\sin\theta)/\lambda$, which corresponds to a spacing 3d between the transmitting antenna 11 and the transmitting antenna 13, are set as reception channels allocated to the receiving antennas 11 through 14 corresponding to the transmitting antenna 13. More particularly, the reception signal received by the antenna 11 is set as a reception signal of the reception channel CH4 that is shifted from the reception signal of the reception channel CH1 by a phase difference $6\pi d(\sin\theta)/\lambda$. The reception signal received by the antenna 12 is set as a reception signal of the reception channel CH5 that is shifted from the reception channel CH4 by the phase difference $2\pi d(\sin\theta)/\lambda$. The reception signal received by the antenna 13 is set as a reception signal of the reception channel CH7 that is shifted from the reception channel CH5 by a phase difference $4\pi d(\sin\theta)/\lambda$. The reception signal received by the antenna 14 is set as a reception signal of the reception channel CH8 that is shifted from the reception channel CH7 by a phase difference $2\pi d(\sin\theta)/\lambda$.

(7) The signal processing circuit 40 supplies a transmission selection signal to the switch circuit 22 and supplies, to the switch circuit 21, an antenna selection signal used to select the antenna 14. The transmitting antenna 14 transmits a transmission signal generated by the VCO 31 to the detection area.

(8) The signal processing circuit 40 supplies a reception selection signal to the switch circuit 22 and supplies an antenna selection signal to the switch circuit 21. The antenna selection signal when receiving is the same as the antenna selection signals indicated in (2), (4), and (6). The antennas 11 through 14 successively function as a receiving antenna, and receive a reflected wave based on the transmission signal supplied from the transmitting antenna 14. The receiving antennas 11 through 14 successively output the reception signal to the LNA 33 via the switch circuit 21 and the switch circuit 22.

In this case, reception channels that are obtained by shifting the reception channels corresponding to the transmitting antenna 11 by a phase difference $8\pi d(\sin\theta)/\lambda$, which corresponds to a spacing 4d between the transmitting antenna 11 and the transmitting antenna 14, are set as reception channels allocated to the receiving antennas 11 through 14 corresponding to the transmitting antenna 14. More particularly, the reception signal received by the antenna 11 is set as a reception signal of the reception channel CH5 that is shifted from the reception signal of the reception channel CH1 by a phase difference $8\pi d(\sin\theta)/\lambda$. The reception signal received by the antenna 12 is set as a reception signal of the reception channel CH6 that is shifted from the reception channel CH5 by the phase difference $2\pi d(\sin\theta)/\lambda$. The reception signal received by the antenna 13 is set as a reception signal of the reception channel CH8 that is shifted from the reception channel CH6 by a phase difference $4\pi d(\sin\theta)/\lambda$. The reception signal received by the antenna 14 is set as a reception signal of the reception channel CH9 that is shifted from the reception channel CH8 by a phase difference $2\pi d(\sin\theta)/\lambda$.

In this way, four transmitting-and-receiving two-way antennas are arranged with spacings d, 2d, and d therebetween. By switching transmitting antennas and generating reception signals at all the receiving antennas for each of the transmitting antennas, nine reception channels arranged with a uniform phase difference therebetween using the four transmitting-and-receiving two-way antennas can be formed. This allows the structuring of a small radar apparatus having superior azimuth (angle) detection performance without an undetected azimuth in the middle of detected azimuths. In the above-described structure, since the spacings between the four antennas are d, 2d, and d, and an arrangement length of the antenna array is 4d, a smaller apparatus with superior azimuth detection performance can be provided compared with a radar apparatus (an arrangement length of an antenna array is 5d) disclosed in Patent Document 3.

Next, a radar apparatus according to a second embodiment will be described with reference to the drawings.

FIG. 2(A) is a block diagram showing a structure of a main part of the radar apparatus according to the second embodiment, and FIG. 2(B) is a schematic diagram showing a relationship between transmitting antennas and reception channels.

Compared with the radar apparatus described in the first embodiment (FIG. 1(A)), the radar apparatus according to the second embodiment additionally includes antennas 15 and 16, and includes a switch circuit 23 instead of the switch circuit 21. Other structures are the same as those described in the radar apparatus described in the first embodiment. Here, similarly to the switch circuits 21 and 22, the switch circuit 23 may also be an arbitrary type of switch.

The antennas 15 and 16 are transmitting-and-receiving two-way antennas and arranged to target a detection area in a direction different from that of the array antenna 10 including the antennas 11 through 14. For example, the antenna 15 is arranged in a state in which a front side direction of the antenna 16 is rotated by +45° with respect to the front side direction of the antennas 11 through 14. The antenna 16 is arranged in a state in which a front side direction of the antenna 15 is rotated by −45° with respect to the front side direction of the antennas 11 through 14.

In response to an antenna selection signal supplied from the signal processing circuit 40, the switch circuit 23 selects one of the antennas 11 through 16 and connects the antenna to the switch circuit 22.

The signal processing circuit 40 performs transmission-and-reception switching processing and antenna selection processing with respect to the antennas 11 through 14 similarly to the first embodiment. However, with respect to the antennas 15 and 16, the signal processing circuit 40 performs transmitting-antenna switching processing in a modulation cycle.

In such a radar apparatus, as shown in the first embodiment, if processing using the reception channels CH1 through CH9 is performed using the antennas 11 through 14, the antenna 15 is selected as a transmitting antenna in response to the start of a new modulation cycle. The antenna 15 transmits a transmission signal to a corresponding detection area. The antenna 15 is selected as a receiving antenna. The antenna 15 receives a reflected wave corresponding to the transmission signal transmitted therefrom, generates a reception signal, and outputs the reception signal to the LNA 33 via the switch circuits 23 and 22. This transmission-and-reception switching processing is continually performed over at least one modulation cycle. This sets an independent reception channel CH31 (a circular shape shown in FIG. 2(B)). There is one to one correspondence between the antenna 15 and the independent reception channel CH31. Next, the antenna 16 is selected as the transmitting antenna in synchronization with the start of a new modulation cycle, and the antenna 16 transmits a transmission signal to a corresponding detection area. The antenna 16 is selected as a receiving antenna. The antenna 16 receives a reflected wave corresponding to the transmission signal transmitted therefrom, generates a reception signal, and outputs the reception signal to the LNA 33 via the switch circuits 23 and 22. This transmission-and-reception switching processing is also continually performed over at least one modulation cycle. This sets an independent reception channel CH32 (a circular shape shown in FIG. 2(B)). There is one to one correspondence between the antenna 16 and the independent reception channel CH32.

By performing such detection processing, the detection areas corresponding to the independent channels obtained by transmitting and receiving performed by individual antennas 15 and 16 are added to respective both ends of reception channels arranged by a phase difference using the antennas 11 through 14 of the array antenna 10. This enables object detection to be performed in a detection area broader than the detection area of the antennas 11 through 14. In this case, a holographic method, which is used when detection is performed using the antennas 11 through 14, is not used in the areas detected by the antennas 15 and 16. Thus, detection processing can be speeded up. In addition, with respect to the antennas 15 and 16, it is not necessary for the switch circuit 23 to perform switching at high speed. Thus, in this case, azimuth detection accuracy at peripheral portions, which are not in the front side direction, corresponding to the antennas 15 and 16 cannot be improved. However, this detection processing is effective in a case of, for example, a front-and-peripheral two-way radar apparatus in which a high detection accuracy in the front side direction, which is the main priority, is maintained and object detection in the peripheral portion, which is the sub priority, is continually performed almost at the same time.

Next, a radar apparatus according to a third embodiment will be described with reference to the drawings.

FIG. 3 is a schematic diagram showing a relationship between transmitting antennas and reception channels according to the third embodiment.

The radar apparatus according to the third embodiment has a structure the same as that of the radar apparatus according to the second embodiment, but differs only in receiving processing when the antennas 15 and 16 are set as transmitting antennas.

The radar apparatus according to the third embodiment switches transmission even between the antennas 15 and 16 in a cycle shorter than the modulation cycle, similarly to the antennas 11 through 14. That is, the antennas 11 through 16 are switched in a cycle shorter than the modulation cycle. If the antenna 15 is treated as a transmitting antenna, the antennas 11 and 12 arranged at an end portion of the array antenna 10, the end portion being near the antenna 15, are set as receiving antennas and receive a reflected wave obtained from reflection of a transmission signal transmitted from the antenna 15. This provides new reception channels CH33 and CH34 in addition to the reception channels CH1 through CH9. If the antenna 16 is treated as a transmitting antenna, the antennas 13 and 14 arranged at an end portion of the array antenna 10, the end portion being near the antenna 16, are set as receiving antennas and a receive reflected wave obtained from reflection of a transmission signal transmitted from the antenna 16. This provides new reception channels CH35 and CH36 in addition to the reception channels CH1 through CH9, CH33, and CH34.

By designing such a structure, the holographic method can be applied in the peripheral portions corresponding to the antennas 15 and 16. Thus, an object can be detected with a predetermined azimuth detection accuracy over a broad range including the detection area corresponding to the antennas 11 through 14 of the array antenna 10, a detection area corresponding to the antenna 15 and the antennas 11 and 12, and a detection area corresponding to the antenna 16 and the antennas 13 and 14.

Here, in the second and third embodiments, there is disclosed the example in which the directions of the front sides of antennas for detecting peripheral portions are arranged at ±45° with respect to the direction of the front side of the array antenna. However, different angles may be used, and furthermore a plurality of antennas may be arranged at each of the angles.

In each of the above-described embodiments, there is shown a case in which the number of antennas (the total number) constituting an array antenna is four. However, even in a case in which the number of antennas differs, the number of antennas arranged at both end portions and a spacing between antennas can be set by using expressions (1) and (2).

FIG. 4 is a block diagram showing a concept of an antenna-arrangement pattern for a radar apparatus according to the present invention.

An array antenna 50 includes a plurality of antennas 51A at one end thereof, a plurality of antennas 51B at the other end thereof, and antennas 51C. The number of the antennas 51A is "N1", and the antennas 51A are arranged with a spacing "d" therebetween. The number of the antennas 51B is "N1", and the antennas 51B are arranged with a spacing "d" therebetween. The number of the antennas 51C is "N2", and the antennas 51C are arranged with a spacing "N1·d" therebetween, and are arranged between a group of the antennas 51A and a group of the antennas 51B. Here, the antennas 51A, 51B, and 51C are arranged in a straight line, and the front sides of all the antennas 51A, 51B, and 51C are in the same direction. The antennas 51C are "0" or positive integers. In response to an antenna selection signal supplied from the signal processing circuit 40, the switch circuit 20 selects one of these antennas 51A, 51B, and 51C, and connects the selected antenna to the switch circuit 22. Here, the switch circuit 20 may also be an arbitrary switch, similarly to the switch circuits 21, 22, and 23.

For example, FIG. 5(A) shows an arrangement in a case in which the number of antennas is "5". FIG. 5(B) is a schematic diagram showing a relationship between transmitting antennas and reception channels in FIG. 5(A).

As shown in FIG. 5(A), if the number of the antennas is "5", the number of antennas is two for each of both end portions, and the number of antennas is one for a central portion. In a case in which a spacing between the antennas at both end portions is set to "d", a spacing between an antenna that is closest to the central portion and arranged in each of both end portions, and the antenna arranged in the central portion is set to "2d". This provides thirteen reception channels CH1 through CH13 that are arranged with a uniform phase difference therebetween, as shown in FIG. 5(B).

FIG. 6(A) shows an arrangement in a case in which the number of antennas is "6". FIG. 6(B) is a schematic diagram showing a relationship between transmitting antennas and reception channels in FIG. 6(A).

As shown in FIG. 6(A), if the number of the antennas is "6", the number of antennas is three for each of both end portions, and the number of antennas is zero (none) for the central portion. In a case in which a spacing between the antennas at both end portions is set to "d", a spacing between the antennas that are closest to the central portion and arranged in both end portions is set to "3d". This provides fifteen reception channels CH1 through CH15 that are arranged with a uniform phase difference therebetween, as shown in FIG. 6(B).

FIG. 7(A) shows an arrangement in a case in which the number of antennas is "8". FIG. 7(B) is a schematic diagram showing a relationship between transmitting antennas and reception channels in FIG. 7(A).

As shown in FIG. 7(A), if the number of the antennas is "8", the number of antennas is four for each of both end portions, and the number of antennas is zero (none) for the central portion. In a case in which a spacing between the antennas at both end portions is set to "d", a spacing between the antennas that are closest to the central portion and arranged in both end portions is set to "4d". This provides twenty-one reception channels CH1 through CH21 that are arranged with a uniform phase difference therebetween, as shown in FIG. 7(B).

In this way, if the number of antennas is given, an appropriate number of reception channels can be set in accordance with the number of the antennas, and the reception channels can be arranged with a uniform phase difference therebetween.

In the above-described processing, an example in which temperature correction is not performed has been described; however, with respect to a microstrip antenna in which patch antennas are arranged on a resin substrate, since reception characteristics markedly change according to temperature, correction expressed by the following expression is performed.

$$a_n(T) \cdot EXP\{j\delta_n(T)\}$$

Here, n represents an array antenna number, T represents a temperature, an(T) represents an amplitude correction coefficient with respect to temperature, and δn(T) represents a phase correction coefficient with respect to temperature.

The signal processing circuit 40 causes such correction information to be prestored in, for example, a memory, and includes a temperature sensor. The signal processing circuit 40 detects a temperature and performs the above-described correction each time when an IF beat signal is input. This can suppress changes in characteristics due to temperature and allows, for example, the azimuth of an object, the speed of the object, and the distance to the object to be accurately detected even if an antenna has inferior temperature characteristics.

The example in which the switch circuit 22 is used to switch between transmission and reception has been described above; however, the structure shown in FIG. 8 may be used to switch between transmission and reception.

FIG. 8 is a block diagram showing a structure of a radar apparatus using other transmission and reception methods according to the present invention.

The radar apparatus shown in FIG. 8 has a structure the same as that of the radar apparatus according to the first embodiment except that the switch circuit 22 is replaced with a switch amplifier 25 and a circulator 26.

The switch amplifier 25 performs an ON operation on the basis of a transmission selection signal supplied from the signal processing circuit 40, amplifies a transmission signal generated by the VCO 31, and supplies the amplified transmission signal to the circulator 26. Moreover, the switch amplifier 25 is changed to be in an OFF state on the basis of a reception selection signal supplied from the signal processing circuit 40, and does not perform any operation.

The circulator 26 outputs the transmission signal supplied from the switch amplifier 25 to the switch circuit 21, and outputs, to the LNA 33, a reception signal input from the switch circuit 21.

Advantages according to the present invention can be obtained even with such a structure. By reducing the number of switch circuits inserted into a reception circuit system, loss of a reception signal can be reduced and object detection can be more accurately performed.

The invention claimed is:

1. A radar apparatus comprising:
    an antenna array in which a plurality of antennas that can transmit as well as receive are arranged; and
    a selector that selects a transmitting antenna and a receiving antenna from among the plurality of antennas of the antenna array,
    wherein a transmission wave whose frequency has been modulated is transmitted from the transmitting antenna selected by the selector, a reflected wave obtained from reflection of the transmission wave is received by one of receiving antennas selected by the selector by successively switching the receiving antennas, and an azimuth of an object is detected using a phase difference between reflected waves received by the receiving antennas, and
    wherein, of the plurality of antennas in the antenna array, there are N1 antennas that can transmit as well as receive arranged with a spacing d therebetween at a first end portion of the antenna array, there are N1 antennas that can transmit as well as receive arranged with a spacing d therebetween at a second end portion of the antenna array, and a spacing between respective antennas of the first and second end portions that are closest to a central portion of the array is N1×d.

2. The radar apparatus according to claim 1, wherein the selector performs selection by switching transmitting antennas in a cycle shorter than a modulation cycle of the transmission wave.

3. The radar apparatus according to claim 1, wherein the total number of the plurality of antennas that constitute the antenna array and can transmit as well as receive is an integer N which is two or more, and
    the number of the antennas N1 in the first and second end portions of the array is an integer rounded up from (N+3)/4.

4. The radar apparatus according to claim 1, wherein the plurality of antennas in the antenna array are arranged in a straight line such that transmission-and-reception surfaces of the plurality of antennas are directed in the same direction.

5. The radar apparatus according to claim 4, further comprising wide-angle detection antennas arranged at both ends of the antenna array in a manner such that a transmission-and-reception surface of the wide-angle detection antennas is directed in a direction different from that of the plurality of antennas.

6. The radar apparatus according to claim 5, wherein the selector performs, in synchronization with the modulation cycle, transmission-switching selection for the wide-angle detection antennas.

7. The radar apparatus according to claim 5, wherein the selector performs, in a cycle shorter than the modulation cycle, transmission-switching selection for the wide-angle detection antennas, the wide-angle detection antennas are not selected as receiving antennas, and an antenna of the plurality of antennas that is proximal to one of the wide-angle detection antennas is selected as the receiving antenna, wherein the antenna proximal to the wide-angle detection antennas that is selected as the receiving antenna being located in one of the first and second end portions in the antenna array.

8. The radar apparatus according to claim 1, further comprising a detector having a temperature sensor, the detector performing object detection based on the reflected wave after the reflected wave is corrected on the basis of a temperature detected by the temperature sensor.

9. A radar apparatus comprising:
an antenna array in which a plurality of antennas that can transmit as well as receive are arranged; and
a selector that selects a transmitting antenna and a receiving antenna from among the plurality of antennas of the antenna array,
wherein a transmission wave whose frequency has been modulated is transmitted from the transmitting antenna selected by the selector, a reflected wave obtained from reflection of the transmission wave is received by one of receiving antennas selected by the selector by successively switching the receiving antennas, and an azimuth of an object is detected using a phase difference between reflected waves received by the receiving antennas, and
wherein, of the plurality of antennas in the antenna array, there are N1 antennas that can transmit as well as receive arranged with a spacing d therebetween at a first end portion of the antenna array, there are N1 antennas that can transmit as well as receive arranged with a spacing d therebetween at a second end portion of the antenna array, and an antenna that can transmit as well as receive is arranged with a spacing N1×d between the first and second end portions of the array.

10. The radar apparatus according to claim 9, wherein the selector performs selection by switching transmitting antennas in a cycle shorter than a modulation cycle of the transmission wave.

11. The radar apparatus according to claim 9, wherein the total number of the plurality of antennas that constitute the antenna array and can transmit as well as receive is an integer N which is two or more, and the number of the antennas N1 in the first and second end portions of the array is an integer rounded up from (N+3)/4.

12. The radar apparatus according to claim 9, wherein the plurality of antennas in the antenna array are arranged in a straight line such that transmission-and-reception surfaces of the plurality of antennas are directed in the same direction.

13. The radar apparatus according to claim 12, further comprising wide-angle detection antennas arranged at both ends of the antenna array in a manner such that a transmission-and-reception surface of the wide-angle detection antennas is directed in a direction different from that of the plurality of antennas.

14. The radar apparatus according to claim 13, wherein the selector performs, in synchronization with the modulation cycle, transmission-switching selection for the wide-angle detection antennas.

15. The radar apparatus according to claim 13, wherein the selector performs, in a cycle shorter than the modulation cycle, transmission-switching selection for the wide-angle detection antennas, the wide-angle detection antennas are not selected as receiving antennas, and an antenna of the plurality of antennas that is proximal to one of the wide-angle detection antennas is selected as the receiving antenna, wherein the antenna proximal to the wide-angle detection antennas that is selected as the receiving antenna being located in one of the first and second end portions in the antenna array.

16. The radar apparatus according to claim 9, further comprising a detector having a temperature sensor, the detector performing object detection based on the reflected wave after the reflected wave is corrected on the basis of a temperature detected by the temperature sensor.

* * * * *